United States Patent
Sasaki et al.

(10) Patent No.: US 11,175,433 B2
(45) Date of Patent: Nov. 16, 2021

(54) MULTI OPTICAL AXIS SENSOR

(71) Applicant: OMRON Corporation, Kyoto (JP)

(72) Inventors: Shunkichi Sasaki, Osaka (JP);
Nobuchika Takiguchi, Moriyama (JP);
Satoshi Nishiuchi, Takatsuki (JP);
Keisaku Kikuchi, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 16/642,035

(22) PCT Filed: Feb. 12, 2019

(86) PCT No.: PCT/JP2019/004897
§ 371 (c)(1),
(2) Date: Feb. 26, 2020

(87) PCT Pub. No.: WO2019/171888
PCT Pub. Date: Sep. 12, 2019

(65) Prior Publication Data
US 2020/0249374 A1 Aug. 6, 2020

(30) Foreign Application Priority Data
Mar. 7, 2018 (JP) .............................. JP2018-041081

(51) Int. Cl.
*G01V 8/20* (2006.01)
*G01J 1/02* (2006.01)

(52) U.S. Cl.
CPC .............. *G01V 8/20* (2013.01); *G01J 1/0271* (2013.01)

(58) Field of Classification Search
CPC ......... G01V 8/20; G01J 1/0271; G01J 1/0407
(Continued)

(56) References Cited

U.S. PATENT DOCUMENTS

2009/0001298 A1 1/2009 Deguchi
2012/0112049 A1 5/2012 Shimokawa et al.
(Continued)

FOREIGN PATENT DOCUMENTS

JP 2002-075149 A 3/2002
JP 2007-073417 A 3/2007
(Continued)

OTHER PUBLICATIONS

An English translation of the International Search Report("ISR") of PCT/JP2019/004897 dated May 14, 2019.
(Continued)

*Primary Examiner* — Kevin K Pyo
(74) *Attorney, Agent, or Firm* — Metrolex IP Law Group, PLLC

(57) ABSTRACT

The present invention maintains sealing of the housing over a long period of time. A multiple-optical-axis photoelectric sensor (100) includes a light projector (110) and a light receiver (120) whose external forms are each formed by a housing (1) including an outer case (10) constituted by a main body case (11) and a first cap member (12), a light-transmitting plate (15), a first pressing member (20A), second pressing members (20B), a first adhesive tape (17A), and second adhesive tapes (17B). The first cap member (12) has a supporting part (12a) provided on its inner side, and an elastic member (18) is provided between the second pressing member (20B) and a portion of the light-transmitting plate (15) supported by the supporting part (12a). The light-transmitting plate (15) is pressed toward the first cap member (12) via the elastic member (18).

2 Claims, 6 Drawing Sheets

(58) Field of Classification Search
USPC .......................................................... 250/221
See application file for complete search history.

(56) References Cited

U.S. PATENT DOCUMENTS

| | | |
|---|---|---|
| 2018/0017435 A1 | 1/2018 | Yamaji et al. |
| 2018/0017706 A1 | 1/2018 | Nishiuchi et al. |
| 2018/0052043 A1 | 2/2018 | Kimura |
| 2019/0196056 A1* | 6/2019 | Mogi ....................... G01V 8/20 |

FOREIGN PATENT DOCUMENTS

| | | |
|---|---|---|
| JP | 4628402 B2 | 2/2011 |
| JP | 2016-195005 A | 11/2016 |
| JP | 2016-195006 A | 11/2016 |
| JP | 2018-010789 A | 1/2018 |
| JP | 2018-010790 A | 1/2018 |
| KR | 100986716 B1 | 10/2010 |
| WO | 2011/013643 A1 | 2/2011 |

OTHER PUBLICATIONS

The Written Opinion("WO") of PCT/JP2019/004897 dated May 14, 2019.

The Office Action dated Mar. 11, 2021 for the counterpart Korean patent application and full English translation.

* cited by examiner

MULTI OPTICAL AXIS SENSOR

TECHNICAL FIELD

The present invention relates to a multiple-optical-axis photoelectric sensor including a light projector and a light receiver. An external form of each of the light projector and the light receiver is constituted by a housing including (i) an outer case having a front surface with an opening, (ii) a light-transmitting plate that covers the opening and (iii) a pressing member that presses the light-transmitting plate toward the outer case.

BACKGROUND ART

Patent Literature 1 discloses a photoelectric sensor including (i) a main body case, (ii) an end member, (iii) a light-transmitting plate, (iv) a first pressing member for pressing and fixing the light-transmitting plate to the main body case, and (v) a second pressing member for pressing and fixing the light-transmitting plate to the end member. In the photoelectric sensor, adhesive tapes are provided between the main body case and the light-transmitting plate and between the end member and the light-transmitting plate, respectively. According to this arrangement, the first pressing member, the second pressing member, and the adhesive tapes prevent a liquid from penetrating into the inside.

CITATION LIST

Patent Literature

Patent Literature 1
Japanese Patent No. 4628402 (Publication date: Feb. 9, 2011)

SUMMARY OF INVENTION

Technical Problem

However, in the photoelectric sensor disclosed in Patent Literature 1, lengths of the first pressing member and the second pressing member need to be changed in accordance with a length of the photoelectric sensor. This causes unevenness in dimensions of the first pressing member and the second pressing member. As a result, a gap occurs between the first pressing member and the second pressing member. Moreover, an insertion position of the first pressing member or the second pressing member may be displaced during assembly of the photoelectric sensor, and therefore a gap may occur between the first pressing member and the second pressing member. Once a gap occurs between the first pressing member and the second pressing member, a liquid such as oil penetrates into the inside through the gap. Moreover, the second pressing member has a mounting hole for attaching the second pressing member to the end member, and a liquid such as oil penetrates into the inside through the mounting hole.

If a liquid such as oil penetrates into the inside, the adhesive tape is dissolved and deteriorated. This causes a problem that sealing property would be deteriorated after a certain period of time elapses.

An object of an aspect of the present invention is to provide a multiple-optical-axis photoelectric sensor which can maintain sealing of a housing over a long period of time.

Solution to Problem

In order to attain the object, a multiple-optical-axis photoelectric sensor in accordance with an aspect of the present invention includes: a light projector; and a light receiver; an external form of each of the light projector and the light receiver being constituted by a housing, the housing including an outer case, a light-transmitting plate, a pressing member, and an adhesive member, the outer case having a front surface with an opening, the light-transmitting plate covering the opening, the pressing member pressing the light-transmitting plate toward the outer case, and the adhesive member causing the light-transmitting plate to adhere to the outer case, the outer case having a supporting part which is provided on an inner side of the outer case for supporting an edge of the light-transmitting plate via the adhesive member, an elastic member being provided between the pressing member and a portion of the light-transmitting plate which portion is supported by the supporting part, and the light-transmitting plate being pressed toward the outer case via the elastic member.

Advantageous Effects of Invention

According to an aspect of the present invention, it is possible to provide a multiple-optical-axis photoelectric sensor in which the labor required for assembling work is reduced.

DESCRIPTION OF EMBODIMENTS

Embodiment 1

The following description will discuss an embodiment (hereinafter, also referred to as "the present embodiment") in accordance with one aspect of the present invention with reference to the drawings. Note that the present embodiment described below is merely an example of the present invention in all respects. It will be understood that various modifications and variations can be made without departing from the scope of the present invention. In other words, in the implementation of the present invention, a specific configuration corresponding to the embodiment may be appropriately employed.

§ 1 Application Example

Figure 2:
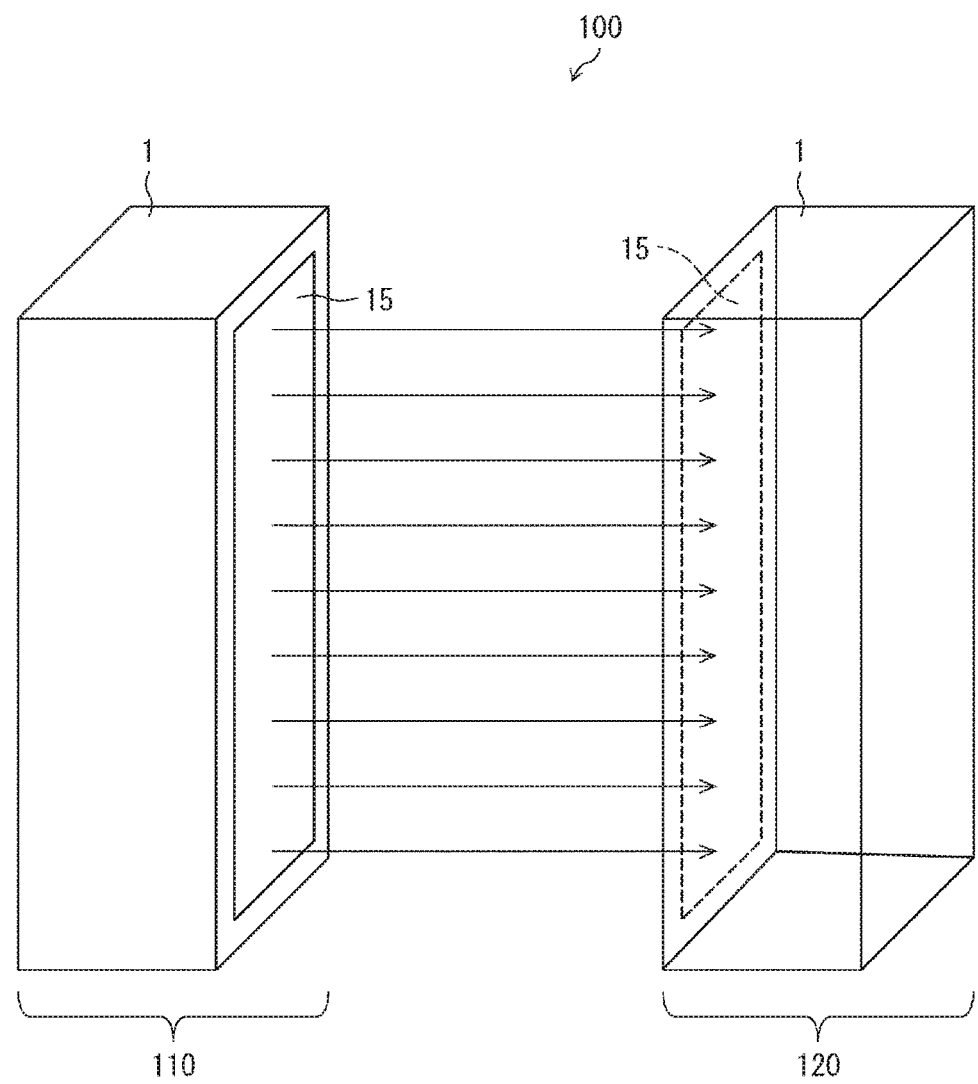
FIG. 2 is a diagram illustrating an overview of a multiple-optical-axis photoelectric sensor in accordance with Embodiment 1.

First, with reference to FIGS. 2 and 3, an example case to which the present invention is applied will be described. FIG. 2 is a diagram illustrating an overview of a multiple-optical-axis photoelectric sensor 100 in accordance with the present embodiment. As illustrated in FIG. 2, the multiple-optical-axis photoelectric sensor 100 includes a light projector 110 and a light receiver 120, which are arranged to face each other via a predetermined detection region. As exemplified in FIG. 2, a plurality of optical axes are set between the light projector 110 and the light receiver 120, and the multiple-optical-axis photoelectric sensor 100 detects an object based on light entrance/blocking conditions of these optical axes.

Figure 3:
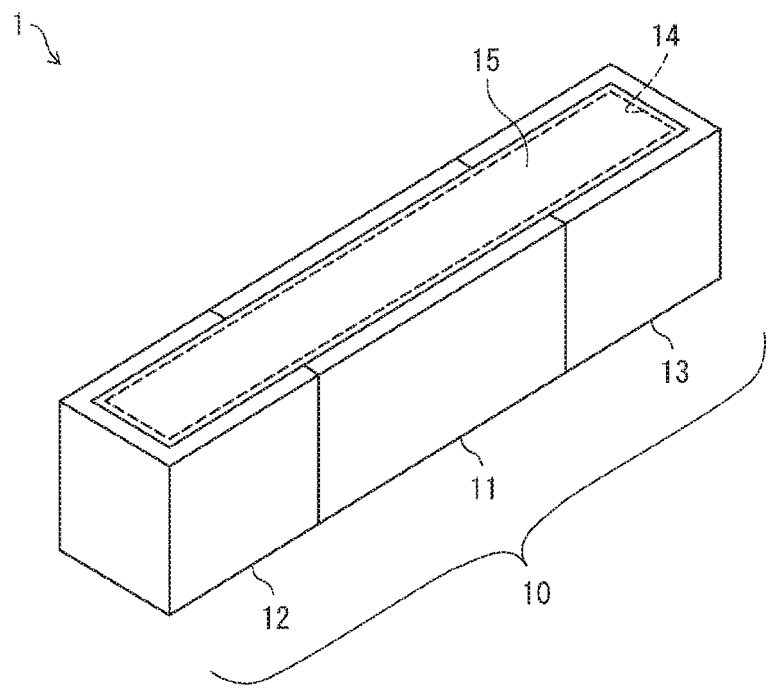
FIG. 3 is a diagram schematically illustrating the housing in accordance with Embodiment 1.

FIG. 3 is a diagram schematically illustrating a housing 1. The housing 1 is used as a housing for each of the light projector 110 and the light receiver 120. The housing 1 includes a main body case 11, a first cap member 12 (end member), a second cap member 13 (end member), a light-transmitting plate 15, and a pressing member 20 (see FIG. 1). In FIG. 3, the pressing member 20 is omitted.

According to the housing 1, the outer case 10 is constituted by the main body case 11, the first cap member 12, and the second cap member 13, as illustrated in FIG. 3. Specifically, the outer case 10 has a configuration in which the first cap member 12 and the second cap member 13 are fitted into both ends in a longitudinal direction of the main body case 11 which has a tubular shape with a rectangular cross section.

An opening 14 is provided in one surface of the outer case 10. The opening 14 is covered with the light-transmitting plate 15. The light-transmitting plate 15 is pressed toward the housing 1 by the pressing member 20. In the following descriptions, the surface of the housing 1 in which the opening 14 is provided is referred to as "front surface". A direction from the inside of the housing 1 to the front surface is referred to as "front" or "front side". The opening 14 extends over the main body case 11, the first cap member 12, and the second cap member 13 as illustrated in FIG. 3.

The multiple-optical-axis photoelectric sensor 100 can be expressed as follows: That is, the multiple-optical-axis photoelectric sensor 100 includes the light projector 110 and the light receiver 120; an external form of each of the light projector 110 and the light receiver 120 is formed by the housing 1; the housing 1 includes the outer case 10, the light-transmitting plate 15, and the pressing member 20; the outer case 10 has a front surface with the opening 14; the light-transmitting plate 15 covers the opening 14; and the pressing member 20 presses the light-transmitting plate 15 toward the housing 1.

§ 2 Configuration Example

Figure 4:
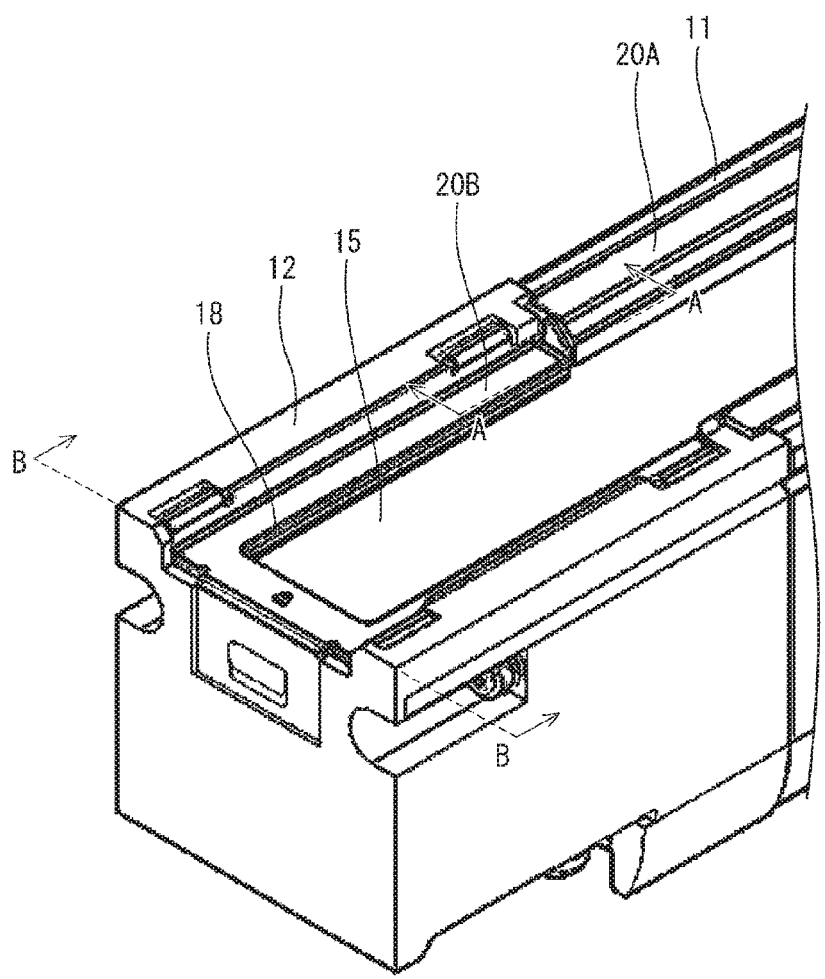
FIG. 4 is an enlarged perspective view illustrating a first cap member and surrounding parts of the housing in accordance with Embodiment 1.
Figure 5:
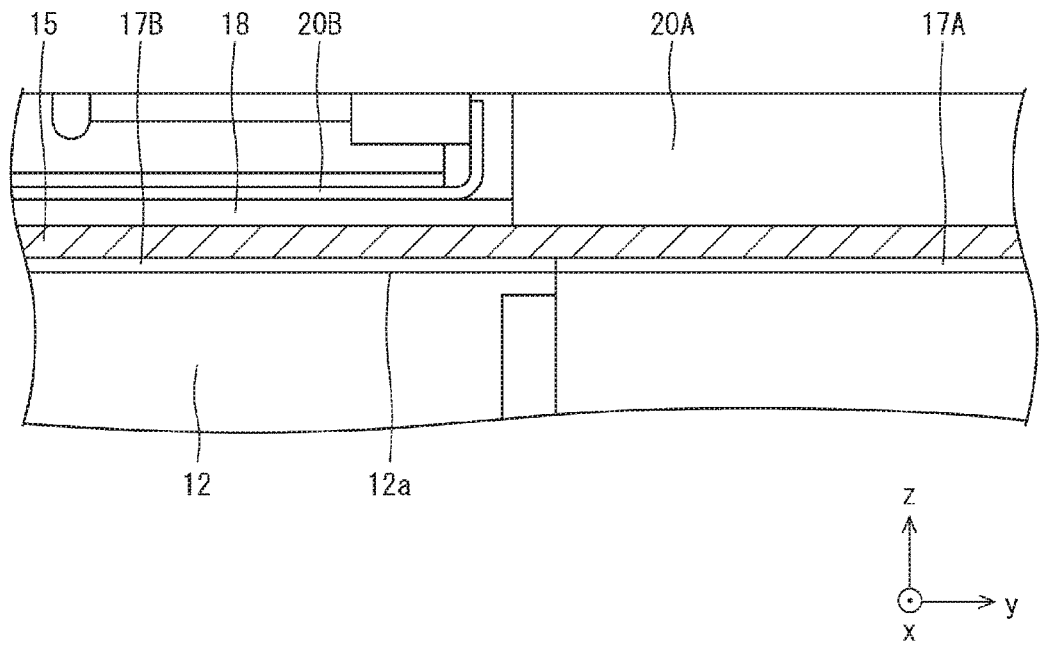
FIG. 5 is a cross-sectional view taken along the line A-A in FIG. 4.
Figure 6:
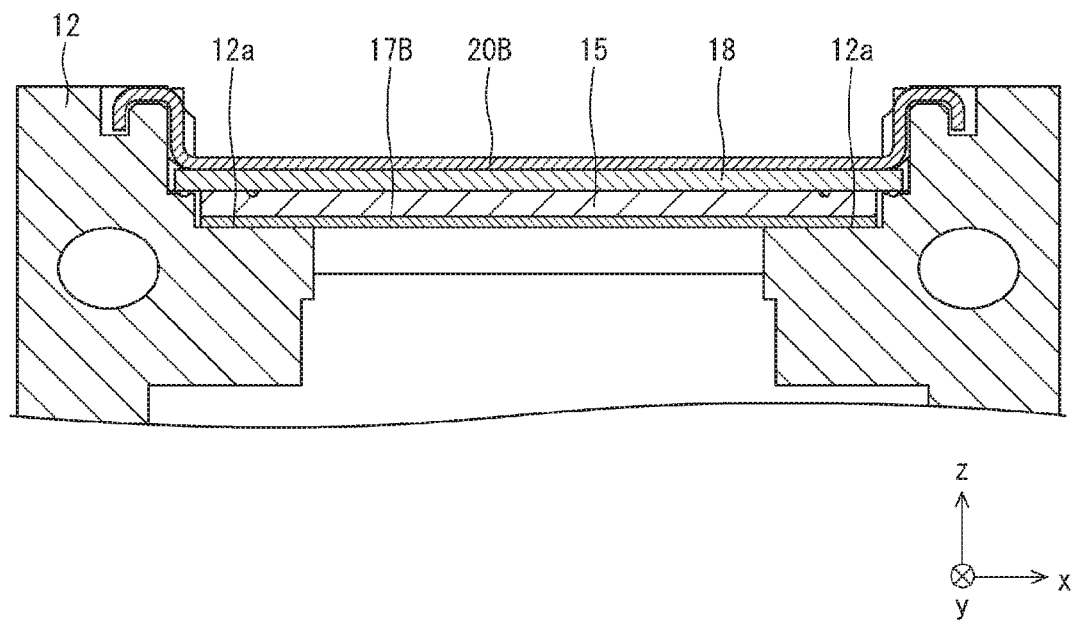
FIG. 6 is a cross-sectional view taken along the line B-B in FIG. 4.

The following description will discuss a configuration example of the housing 1 with reference to FIG. 1 and FIGS. 4 through 6. FIG. 4 is an enlarged perspective view illustrating the first cap member 12 and surrounding parts of the housing 1. FIG. 5 is a cross-sectional view taken along the line A-A in FIG. 4. The cross section illustrated in FIG. 5 is perpendicular to a width direction of the housing 1, and is a part of a cross section including a supporting part 12a described later. FIG. 6 is a cross-sectional view taken along the line B-B in FIG. 4. The cross section illustrated in FIG. 6 is perpendicular to a longitudinal direction of the housing 1, and is a cross section including the supporting part 12a. Note that, in FIG. 1 and FIGS. 4 through 6, the width direction of the housing 1 is defined as an x direction, the longitudinal direction is defined as a y direction, and a front-behind direction is defined as a z direction. In particular, a frontward direction from the housing 1 is defined as a +z direction.

Figure 1:
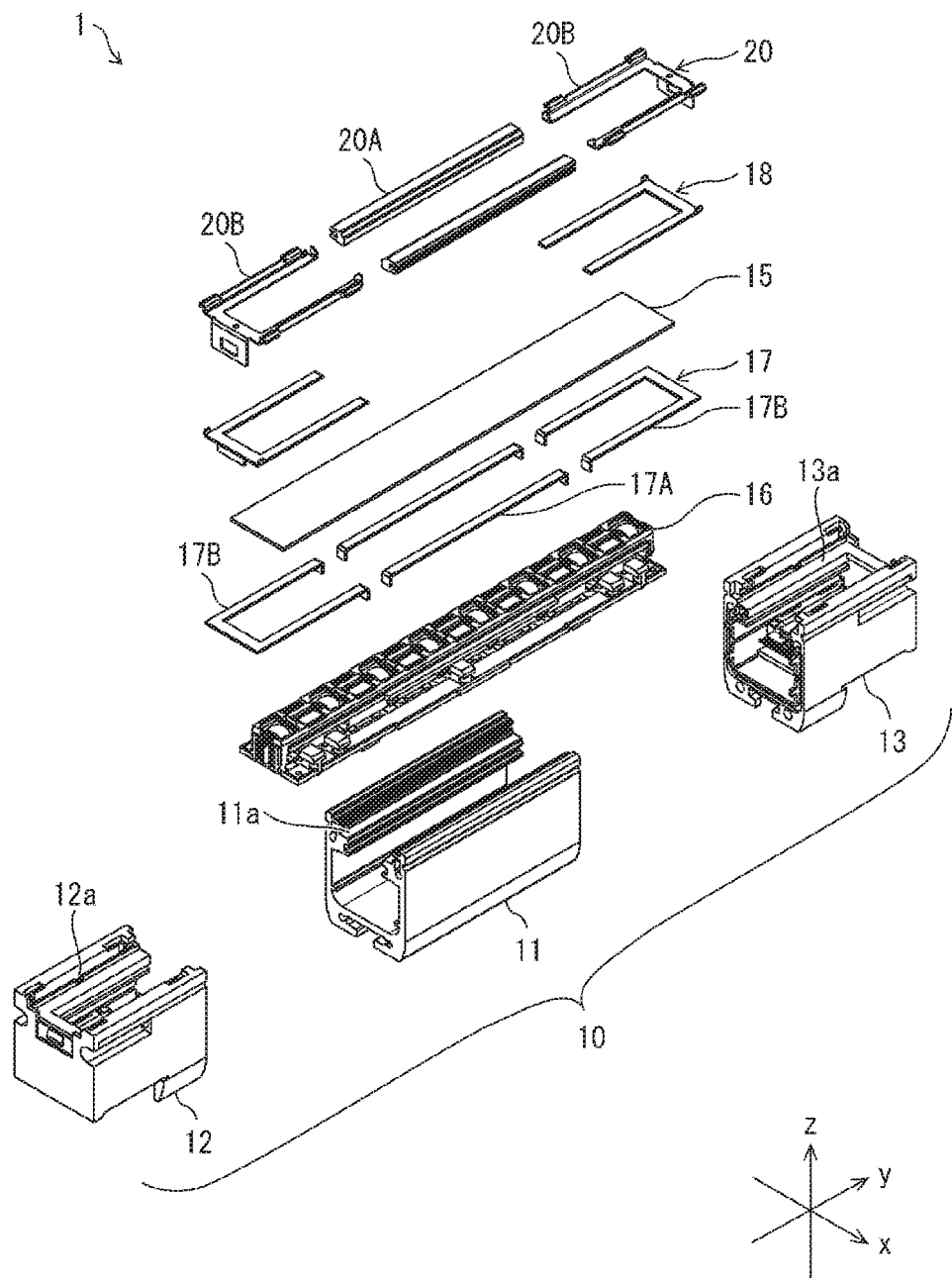
FIG. 1 is an exploded perspective view illustrating a configuration of a housing in accordance with Embodiment 1.

FIG. 1 is an exploded perspective view illustrating a configuration of the housing 1 in accordance with the present embodiment. As above described, the housing 1 has the configuration in which the first cap member 12 and the second cap member 13 are fitted into both ends of the main body case 11 in the longitudinal direction.

As illustrated in FIG. 1, an optical element 16 is contained inside the housing 1. The optical element 16 is a light emitting element in a case where the housing 1 is used in the light projector 110, and the optical element 16 is a light receiving element in a case where the housing 1 is used in the light receiver 120. A connector (not illustrated) is provided on at least one of the first cap member 12 and the second cap member 13. The connector is provided for supplying electric power to the optical element 16, controlling the optical element 16, extracting a signal from the optical element 16, and the like.

As illustrated in FIG. 1, in upper parts of inner surfaces of the main body case 11, the first cap member 12, and the second cap member 13, a supporting part 11a, a supporting part 12a, and a supporting part 13a are respectively formed for supporting the light-transmitting plate 15. In the housing 1, an adhesive member 17, the light-transmitting plate 15, an elastic member 18, and the pressing member 20 are stacked in this order on front surfaces of the supporting part 11a, the supporting part 12a, and the supporting part 13a.

The adhesive member 17 is constituted by one first adhesive tape 17A (first adhesive member) and two second adhesive tapes 17B (second adhesive member). The first adhesive tape 17A causes the light-transmitting plate 15 to adhere to the main body case. The second adhesive tapes 17B cause the light-transmitting plate 15 to adhere to the first cap member 12 and the second cap member 13, respectively.

A length of the main body case 11 varies in accordance with an aspect to which the multiple-optical-axis photoelectric sensor 100 is applied. According to the multiple-optical-axis photoelectric sensor 100, the adhesive member 17 having a sufficient length is cut according to the length of the main body case 11 and is thus used as the first adhesive tape 17A and the second adhesive tapes 17B. This makes it possible to deal with any lengths of the main body case 11, the first cap member 12, and the second cap member.

The light-transmitting plate 15 is a plate having light-transmitting property, and is arranged so as to cover the opening 14 from the front side of the adhesive member 17. The light-transmitting plate 15 is pressed toward the supporting part 11a, the supporting part 12a, and the supporting part 13a by the pressing member 20 including one first pressing member 20A and two second pressing members 20B. More specifically, the first pressing member 20A presses the light-transmitting plate 15 in a region of the outer case 10 where the main body case 11 exists. The second pressing members 20B press the light-transmitting plate 15 in regions of the outer case 10 where the first cap member 12 and the second cap member 13 exist.

According to the housing 1 in accordance with the present embodiment, as illustrated in FIGS. 5 and 6, the elastic member 18 is provided between the second pressing member 20B and the light-transmitting plate 15 in a region in which the light-transmitting plate 15 is supported by the supporting part 12a (or the supporting part 13a). As illustrated in FIG. 1, the elastic member 18 is formed in a U-shape in accordance with a shape of the supporting part 12a or the supporting part 13a. The light-transmitting plate 15 is pressed toward the first cap member 12 and the second cap member 13 by the second pressing members 20B via the elastic members 18.

The elastic member 18 is made of an elastic material. In the present embodiment, the elastic member 18 is made of rubber. Note, however, that the elastic member 18 is not limited to rubber, provided that the elastic member 18 can have elasticity. For example, the elastic member 18 can be made of an adhesive material.

Since the elastic member 18 has elasticity, the elastic member 18 is stretched by being pressed by the second pressing member 20B. From this, no gap is formed between the second pressing member 20B and the elastic member 18. As a result, even if a liquid (e.g., oil) enters the housing 1 through a mounting hole or the like which is provided in the second pressing member 20B for attaching the second pressing member 20B to the end member, the elastic member 18 can prevent the liquid from further penetrating into the inside of the housing 1. Therefore, deterioration of the adhesive tape due to the liquid such as oil can be prevented. As a result, sealing of the housing can be maintained over a long period of time.

Moreover, as above described, there may be a case where a gap occurs between the first pressing member and the second pressing member, and a liquid such as oil penetrates into the inside through the gap. In view of this, according to the housing 1, the elastic member 18 can be stretched so that an end part of the elastic member 18 on a first pressing member 20A side abuts on the first pressing member 20A, as illustrated in FIG. 5. From this, even if a liquid such as oil enters the housing 1 through a gap between the first pressing member 20A and the second pressing member 20B, the elastic member 18 can prevent the liquid from further penetrating into the inside of the housing 1.

In a case where the elastic member 18 is not provided as in the conventional case, the adhesive member is pressed by the first pressing member and the second pressing member. From this, in order to compensate unevenness in dimensions of components such as the first cap member, the second cap member, the second pressing member, the light-transmitting plate, and the adhesive member, the housing needs to be assembled while pressing the adhesive member with excessive force. In addition, there was a possibility that the adhesive member cannot be appropriately pressed due to warpage of the components or the like, and thus the housing cannot be sealed.

Meanwhile, according to the present embodiment, the elastic member 18 is provided. Therefore, when the adhesive member is pressed by the second pressing member 20B, the adhesive member can be pressed while the elastic member 18 is being deformed. This makes it possible to improve assembly workability, and stable sealing property of the housing 1 can be maintained.

According to the multiple-optical-axis photoelectric sensor 100 in accordance with the present embodiment, the elastic member 18 is provided between the second pressing member 20B and the light-transmitting plate 15. Note, however, that the multi-optical axis photoelectric sensor in accordance with the present invention is not limited to this arrangement. According to a multiple-optical-axis photoelectric sensor in accordance with an aspect of the present invention, the elastic member 18 can be provided between the first pressing member 20A and the light-transmitting plate 15. Alternatively, elastic members 18 can be provided between the first pressing member 20A and the light-transmitting plate 15 and also between the second pressing member 20B and the light-transmitting plate 15.

§ 3 Modification Example

Figure 7:
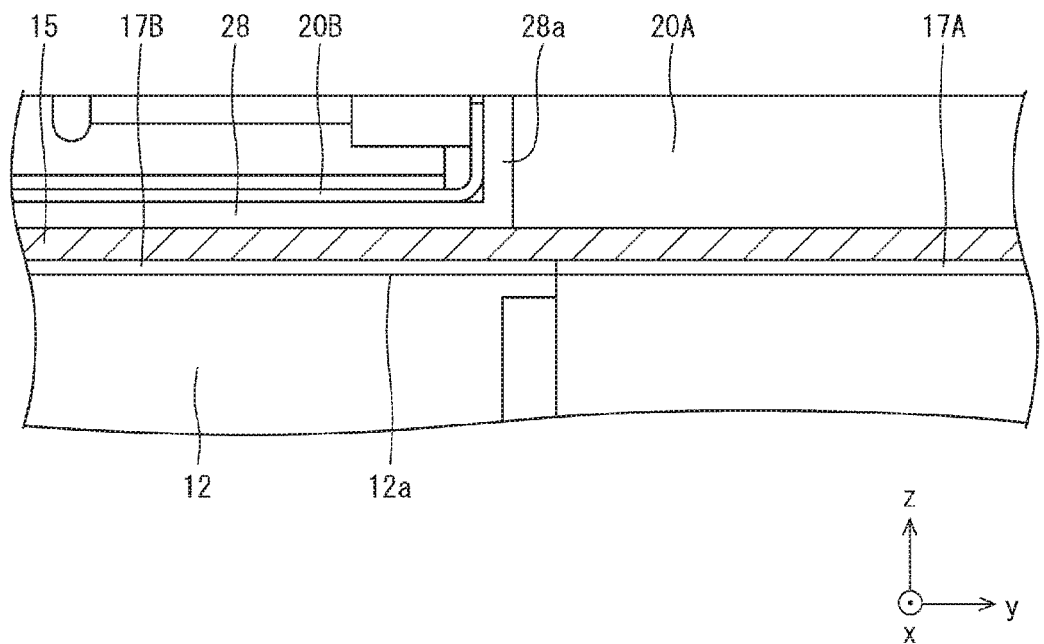
FIG. 7 is a partial cross-sectional view of a cross section which is perpendicular to a width direction of a housing in a modification example of the housing.

FIG. 7 is a cross-sectional view taken in a direction perpendicular to the width direction of a housing 1 in a first modification example, and partially illustrates a cross section including a supporting part 12a.

As illustrated in FIG. 7, the housing 1 in this example has an elastic member 28 instead of the elastic member 18 of Embodiment 1. The elastic member 28 has a bent part 28a which is formed by bending an end part of the elastic member 28 on a main body case 11 side (in other words, a first pressing member 20A side) such that the bent part 28a extends between the first pressing member 20A and the second pressing member. In the housing 1 in this example, the bent part 28a is compressed by the first pressing member 20A and the second pressing member 20B. According to the configuration, a gap between the first pressing member 20A and the second pressing member 20B can be filled with the bent part 28a. Therefore, it is possible to further inhibit a liquid such as oil from penetrating into the inside of the housing 1 through a gap between the first pressing member 20A and the second pressing member 20B.

Aspects of the present invention can also be expressed as follows:

The multiple-optical-axis photoelectric sensor in accordance with an aspect of the present invention includes: a light projector; and a light receiver; an external form of each of the light projector and the light receiver being constituted by a housing, the housing including an outer case, a light-transmitting plate, a pressing member, and an adhesive member, the outer case having a front surface with an opening, the light-transmitting plate covering the opening, the pressing member pressing the light-transmitting plate toward the outer case, and the adhesive member causing the light-transmitting plate to adhere to the outer case, the outer case having a supporting part which is provided on an inner side of the outer case for supporting an edge of the light-transmitting plate via the adhesive member, an elastic member being provided between the pressing member and a portion of the light-transmitting plate which portion is supported by the supporting part, and the light-transmitting plate being pressed toward the outer case via the elastic member.

According to the configuration, the elastic member is stretched by being pressed by the pressing member. From this, no gap is formed between the pressing member and the elastic member. As a result, even if a liquid (e.g., oil) enters the housing through a mounting hole or the like which is provided in the pressing member for attaching the pressing member to the outer case, the elastic member can prevent the liquid from further penetrating into the inside of the housing. Therefore, deterioration of the adhesive member due to the liquid such as oil can be prevented. As a result, sealing of the housing can be maintained over a long period of time.

According to the multiple-optical-axis photoelectric sensor in accordance with an aspect of the present invention, the outer case includes a main body case and end members which are fitted into both ends of the main body case; the pressing member includes a first pressing member and second pressing members, the first pressing member pressing the light-transmitting plate toward the main body case, and the second pressing members pressing the light-transmitting plate toward the respective end members; the adhesive member includes a first adhesive member and second adhesive members, the first adhesive member causing the light-transmitting plate to adhere to the main body case, and the second adhesive members causing the light-transmitting plate to adhere to the respective end members; the elastic member is provided between each of the second pressing members and a portion of the light-transmitting plate which portion is supported by the supporting part that is formed in each of the end members; and the light-transmitting plate is pressed toward each of the end members via the elastic member.

According to the configuration, the elastic member is stretched by being pressed by the second pressing member. From this, no gap is formed between the second pressing member and the elastic member. As a result, even if a liquid (e.g., oil) enters the housing through a mounting hole or the like which is provided in the second pressing member for attaching the second pressing member to the end member, the elastic member can prevent the liquid from further penetrating into the inside of the housing. Therefore, deterioration of the first adhesive member and the second adhesive member due to the liquid such as oil can be prevented. As a result, sealing of the housing can be maintained over a long period of time.

Moreover, there may be a case where a gap occurs between the first pressing member and the second pressing member, and a liquid such as oil penetrates into the inside through the gap. In view of this, according to the above configuration, the elastic member can be stretched by being pressed by the second pressing member so that an end part of the elastic member on a first pressing member side abuts on the first pressing member. From this, even if a liquid such as oil enters the housing through a gap between the first pressing member and the second pressing member, the elastic member can prevent the liquid from further penetrating into the inside of the housing.

According to the multiple-optical-axis photoelectric sensor in accordance with an aspect of the present invention, the elastic member has a bent part which is formed by bending an end part of the elastic member on a main body case side such that the bent part extends between the first pressing member and each of the second pressing members; and the bent part is compressed by the first pressing member and each of the pressing members.

According to the configuration, a gap between the first pressing member and the second pressing member can be filled with the bent part. Therefore, it is possible to further inhibit a liquid such as oil from penetrating into the inside of the housing through a gap between the first pressing member and the second pressing member.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Housing
10: Outer case
11: Main body case
12: First cap member (end member)
12a, 13a: Supporting part
13: Second cap member (end member)
14: Opening
15: Light-transmitting plate
17A: First adhesive tape (first adhesive member)
17B: Second adhesive tape (second adhesive member)
18, 28: Elastic member
20A: First pressing member
20B: Second pressing member
28: Bent part
100: Multiple-optical-axis photoelectric sensor
110: Light projector
120: Light receiver

The invention claimed is:

1. A multiple-optical-axis photoelectric sensor comprising:
   a light projector; and
   a light receiver;
   an external form of each of the light projector and the light receiver being constituted by a housing,
   the housing including an outer case, a light-transmitting plate, a pressing member, and an adhesive member, the outer case having a front surface with an opening, the light-transmitting plate covering the opening, the pressing member pressing the light-transmitting plate toward the outer case, and the adhesive member causing the light-transmitting plate to adhere to the outer case,
   the outer case having a supporting part which is provided on an inner side of the outer case for supporting an edge of the light-transmitting plate via the adhesive member,
   an elastic member being provided between the pressing member and a portion of the light-transmitting plate which portion is supported by the supporting part, and the light-transmitting plate being pressed toward the outer case via the elastic member, wherein:
   the outer case includes a main body case and end members which are fitted into both ends of the main body case;
   the pressing member includes a first pressing member and second pressing members, the first pressing member pressing the light-transmitting plate toward the main body case, and the second pressing members pressing the light-transmitting plate toward the respective end members;
   the adhesive member includes a first adhesive member and second adhesive members, the first adhesive member causing the light-transmitting plate to adhere to the main body case, and the second adhesive members causing the light-transmitting plate to adhere to the respective end members;
   the elastic member is provided between each of the second pressing members and a portion of the light-transmitting plate which portion is supported by the supporting part that is formed in each of the end members; and
   the light-transmitting plate is pressed toward each of the end members via the elastic member.

2. The multiple-optical-axis photoelectric sensor as set forth in claim 1, wherein:
   the elastic member has a bent part which is formed by bending an end part of the elastic member on a main body case side such that the bent part extends between the first pressing member and each of the second pressing members; and
   the bent part is compressed by the first pressing member and each of the second pressing members.

* * * * *